US010566016B2

(12) United States Patent
Yamada et al.

(10) Patent No.: US 10,566,016 B2
(45) Date of Patent: Feb. 18, 2020

(54) FLEXURE OF HARD DISK DRIVE

(71) Applicant: NHK SPRING CO., LTD., Yokohama, Kanagawa (JP)

(72) Inventors: Yukie Yamada, Yokohama (JP); Tetsuya Ueda, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 0 days.

(21) Appl. No.: 16/114,601

(22) Filed: Aug. 28, 2018

(65) Prior Publication Data

US 2019/0066720 A1    Feb. 28, 2019

(30) Foreign Application Priority Data

Aug. 31, 2017 (JP) ................................ 2017-167148

(51) Int. Cl.
*G11B 5/48* (2006.01)
*G11B 21/21* (2006.01)

(52) U.S. Cl.
CPC ............ *G11B 5/4833* (2013.01); *G11B 5/484* (2013.01); *G11B 5/4826* (2013.01); *G11B 5/4846* (2013.01); *G11B 5/4853* (2013.01); *G11B 21/21* (2013.01); *G11B 5/483* (2015.09); *G11B 5/486* (2013.01); *G11B 5/4873* (2013.01)

(58) Field of Classification Search
None
See application file for complete search history.

(56) References Cited

U.S. PATENT DOCUMENTS

| 8,199,442 B2* | 6/2012 | Okawara | G11B 5/4846 360/294.4 |
| 8,248,734 B2* | 8/2012 | Fuchino | G11B 5/4833 310/365 |
| 8,754,575 B2* | 6/2014 | Ikeji | H01L 41/053 310/348 |
| 8,947,833 B2* | 2/2015 | Hanya | G11B 5/4853 360/294.4 |
| 9,076,957 B2* | 7/2015 | Ikeji | H05K 1/00 |
| 9,251,817 B1 | 2/2016 | Hahn et al. | |
| 9,824,704 B2* | 11/2017 | Cray | B32B 37/1207 |

(Continued)

FOREIGN PATENT DOCUMENTS

| CN | 103700376 A | 4/2014 |
| JP | 2014149893 A | 8/2014 |

OTHER PUBLICATIONS

Chinese Office Action dated Aug. 21, 2019 (and English translation thereof) issued in Chinese Application No. 201811013310.1.

*Primary Examiner* — William J Klimowicz
(74) *Attorney, Agent, or Firm* — Holtz, Holtz & Volek PC

(57) ABSTRACT

A flexure includes a metal base, a circuit member, and an actuator. The circuit member includes a base insulating layer, a conductor layer, and a cover insulating layer. The conductor layer includes a second pad, and a reference hole, which is an example of a portion to be protected, in a tongue portion. A second end portion of the actuator is fixed to the second pad via an adhesive. The circuit member includes a wall portion. The wall portion is formed between the second pad and the reference hole. A height of the wall portion is greater than a height of the second pad.

8 Claims, 10 Drawing Sheets

(56) References Cited

U.S. PATENT DOCUMENTS

| | | | | |
|---|---|---|---|---|
| 2010/0032201 A1* | 2/2010 | Ooyabu | ............ | G11B 5/484 |
| | | | | 174/262 |
| 2010/0067151 A1* | 3/2010 | Okawara | ............ | G11B 5/4846 |
| | | | | 360/294 |
| 2010/0165515 A1* | 7/2010 | Ando | ............ | G11B 5/486 |
| | | | | 360/290 |
| 2010/0177445 A1* | 7/2010 | Fuchino | ............ | G11B 5/4833 |
| | | | | 360/294 |
| 2010/0296196 A1* | 11/2010 | Iriuchijima | ............ | G11B 5/4833 |
| | | | | 360/246.1 |
| 2011/0279929 A1* | 11/2011 | Kin | ............ | G11B 5/4853 |
| | | | | 360/294.4 |
| 2012/0224282 A1* | 9/2012 | Hanya | ............ | G11B 5/4826 |
| | | | | 360/244.2 |
| 2014/0085755 A1* | 3/2014 | Hanya | ............ | G11B 5/4853 |
| | | | | 360/244.5 |
| 2015/0213818 A1* | 7/2015 | Imai | ............ | G11B 5/4833 |
| | | | | 360/294.4 |
| 2019/0198047 A1* | 6/2019 | Ee | ............ | G11B 5/484 |

* cited by examiner

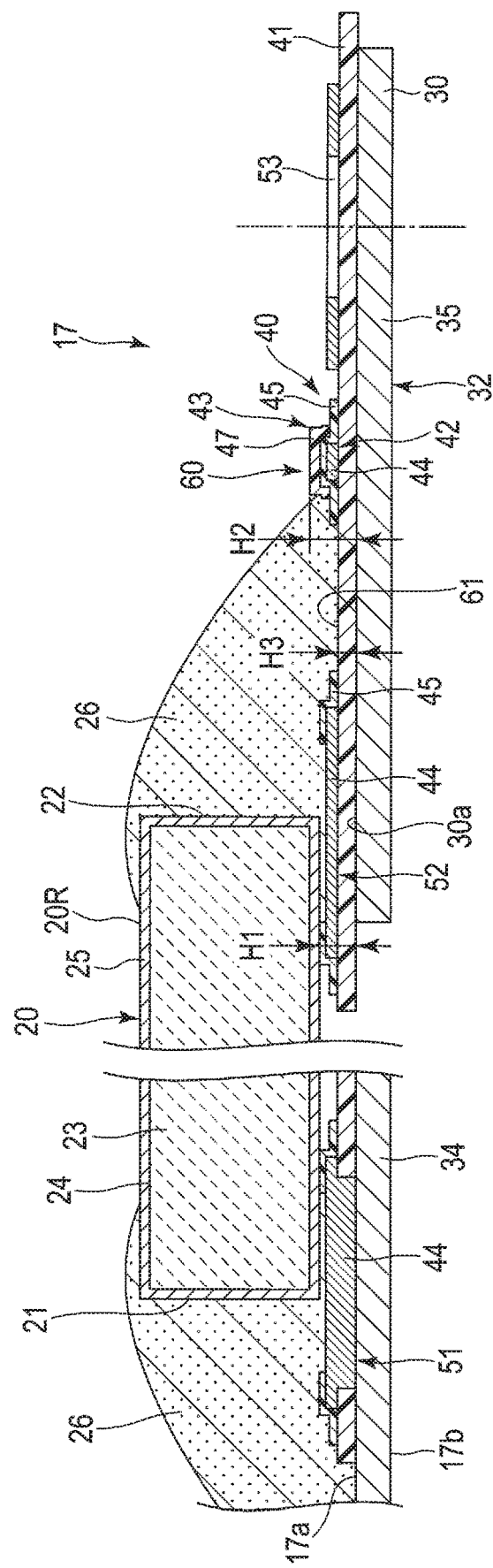
F I G. 5

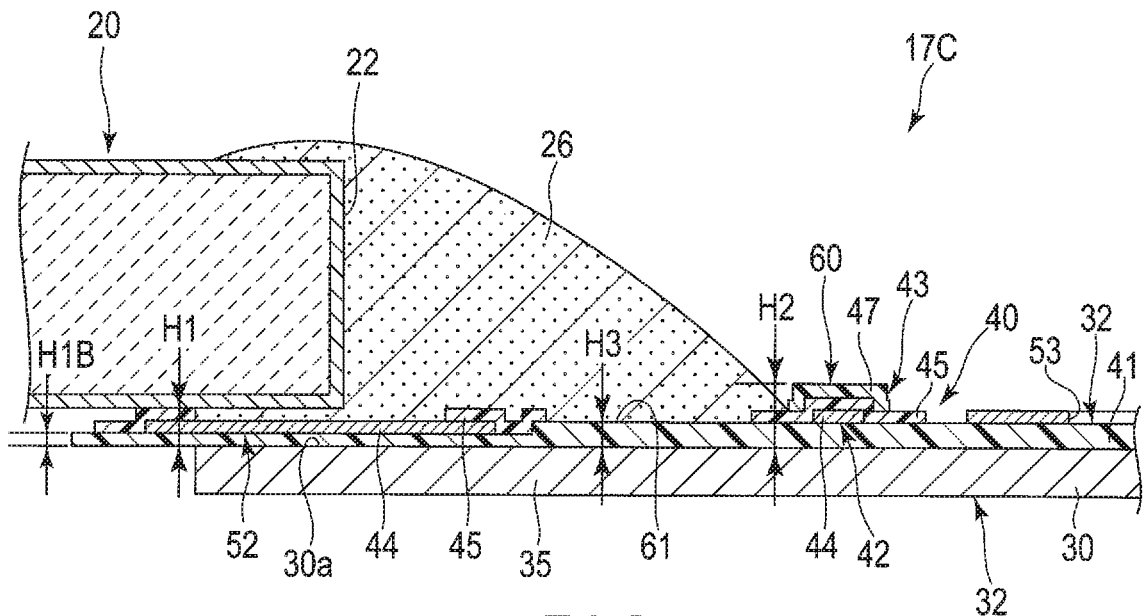
F I G. 8
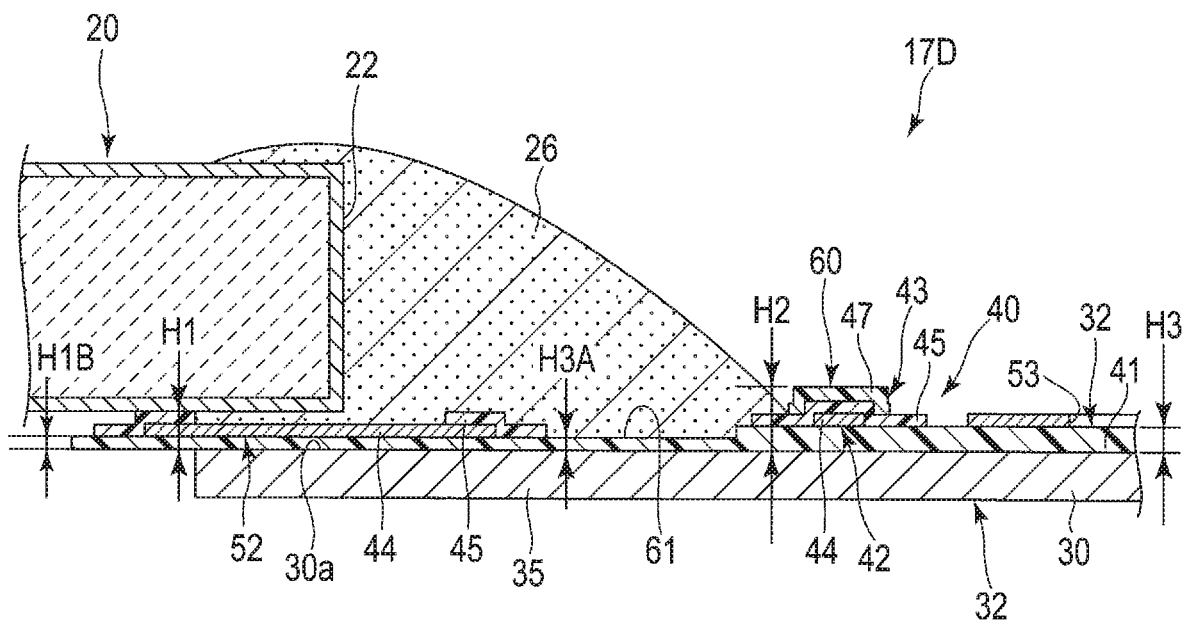
F I G. 9

FLEXURE OF HARD DISK DRIVE

CROSS-REFERENCE TO RELATED APPLICATIONS

This application is based upon and claims the benefit of priority from the prior Japanese Patent Application No. 2017-167148, filed Aug. 31, 2017, the entire contents of which are incorporated herein by reference.

BACKGROUND OF THE INVENTION

1. Field of the Invention

The present invention relates to a flexure of a hard disk drive, and more specifically, to a flexure including an actuator mounted on a tongue portion, for example.

2. Description of the Related Art

In a hard disk drive, in accordance with increase in density of magnetic recording, an actuator using a piezoelectric element or the like tends to be mounted on a suspension. The actuator is mounted on a tongue portion formed at a distal end of a flexure, for example. When the actuator constituted of the piezoelectric element is heated to a temperature higher than the Curie temperature, polarization is lost, so that the actuator is not operated. Accordingly, in order to fix the actuator to the tongue portion, a conductive paste such as a silver paste whose processing temperature is relatively low is used instead of solder. The conducive paste has the function of electrically connecting a circuit member to a terminal of the actuator. Moreover, the conductive paste also functions as an adhesive for fixing the actuator to the tongue portion.

The adhesive before it is applied and cured has liquidity. Accordingly, part of the adhesive may flow to the periphery from the applied portion. The actuator is fixed to a pad of the tongue portion, for example. A reference hole used for positioning of a slider may be formed in the vicinity of the pad. Also, in the vicinity of the pad, connecting terminals electrically connected to terminals of the slider may be formed. An outrigger portion may be formed outside the tongue portion. Adhesion of the adhesive to the reference hole causes the positioning accuracy of the slider to be lowered. When the adhesive adheres to the connecting terminals, the reliability of connection between the slider and the flexure may be lowered. If the adhesive adheres to a part between the tongue portion and the outrigger portion, the spring properties of the tongue portion may be adversely affected.

In the tongue portion, apart from the actuator, the slider may be fixed by the adhesive. In a substrate for a suspension described in Patent Literature 1 (JP 2014-149893 A), an annular spacer is arranged in order to secure a space between a slider and a tongue portion. An adhesive for fixing that spacer is filled in a recess within the spacer. By the recess, spreading of the adhesive around the spacer can be prevented. The spacer is formed at a predetermined height in a circumferential direction of the spacer so that the slider is not inclined.

The slider does not move (extend and contract) like an actuator. In contrast to the slider, the actuator constituted of a piezoelectric element is moved (extends and contracts) when a voltage is applied. For this reason, the actuator must be fixed to the tongue portion more firmly than the slider. It is a common practice to apply an adhesive for fixing the actuator to a pad so as to cover the entirety of the pad in order to ensure sufficient mechanical strength. The spacer described in Patent Literature 1 above may be arranged on the pad of the actuator. However, even if a recess is formed within the spacer, the adhesive filled in the recess may overflow from the pad.

BRIEF SUMMARY OF THE INVENTION

An object of the present invention is to provide a flexure of a hard disk drive capable of preventing an adhesive for fixing an actuator to a tongue portion of the flexure from flowing outside a predetermined range.

A flexure according to one embodiment is used for a hard disk drive. The flexure comprises a metal base, an actuator, and a circuit member. The metal base includes a tongue portion on which a slider is mounted. The circuit member is arranged along the metal base. The actuator is fixed to the tongue portion by an adhesive, and moves the slider on the tongue portion. The circuit member comprises a base insulating layer, a conductor layer, and a cover insulating layer. The base insulating layer is formed on the metal base. The conductor layer is formed on the base insulating layer. The cover insulating layer covers the conductor layer. The circuit member includes a pad arranged on the tongue portion, and a portion to be protected for which adhesion of the adhesive should be prevented. An end portion of the actuator is fixed to the pad via the adhesive. The circuit member includes a wall portion formed between the pad and the portion to be protected. A height of the wall portion from a surface of the metal base is greater than a height of the pad from the surface of the metal base.

According to the flexure of the present embodiment, the adhesive supplied to the pad can be prevented from adhering to the portion to be protected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a cross-sectional view of the gimbal portion taken along line F5-F5 of FIG. 4.

FIG. 8 is a cross-sectional view of a part of a gimbal portion according to a fourth embodiment.

FIG. 9 is a cross-sectional view of a part of a gimbal portion according to a fifth embodiment.

DETAILED DESCRIPTION OF THE INVENTION

First Embodiment

Figure 1:
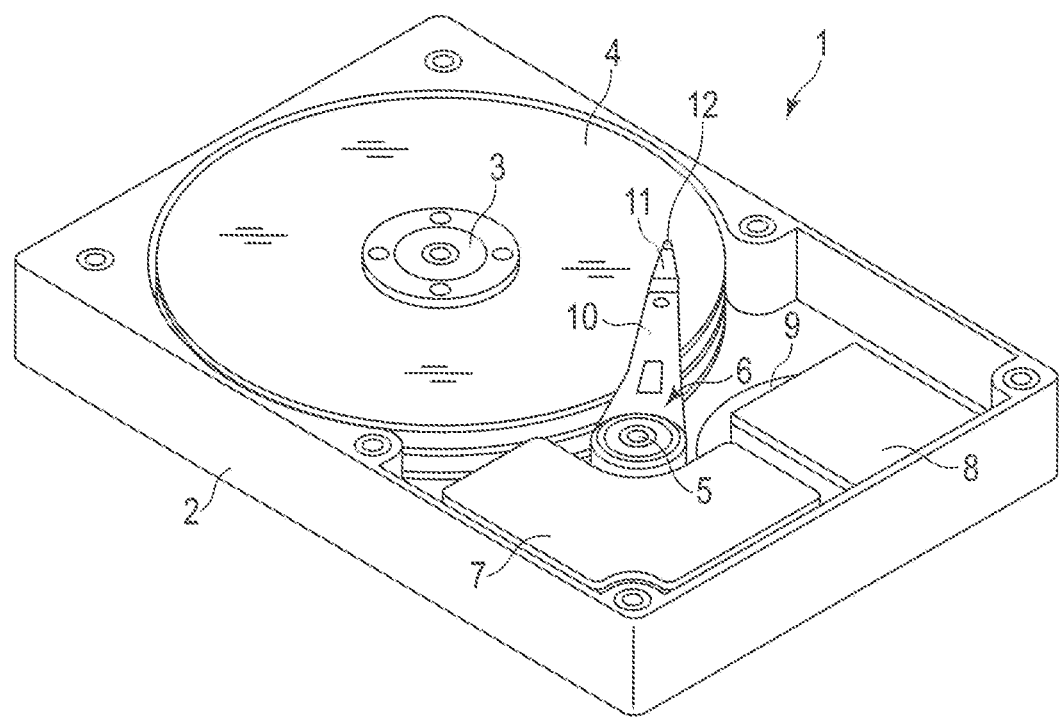
FIG. 1 is a perspective view showing an example of a hard disk drive.

FIG. 1 is a perspective view showing an example of a hard disk drive (HDD). A hard disk drive 1 comprises a case 2, disks 4 rotatable about a spindle 3, a carriage 6 configured to turn about a pivot 5, and a voice coil motor 7 which actuates the carriage 6, and a controller 8. The controller 8 is connected to an electronic device such as an amplifier. The case 2 is sealed by a lid (not shown). The carriage 6 and the controller 8 are connected via a flexible substrate 9.

The carriage 6 is provided with arms 10. A suspension 11 is mounted on a distal end portion of each arm 10. A slider 12, which constitutes a magnetic head, is mounted on the distal end portion of the suspension 11. When each disk 4 rotates at high speed, an air bearing is formed as air flows in between the disk 4 and the slider 12. If the carriage 6 is turned by the voice coil motor 7, the suspension 11 moves radially relative to the disk 4. In this way, the slider 12 moves to a desired track of the disk 4.

Figure 2:
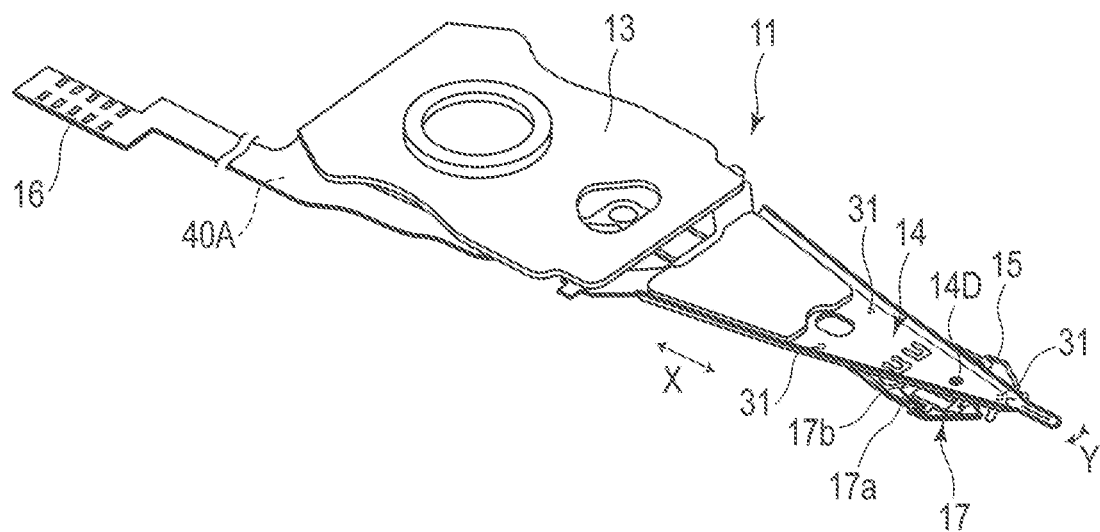
FIG. 2 is a perspective view showing a suspension of the hard disk drive shown in FIG. 1.

FIG. 2 is a perspective view showing the suspension 11. The suspension 11 comprises a base plate 13, a load beam 14, and a flexure 15 with circuit member. The base plate 13 is secured to the arm 10 (FIG. 1) of the carriage 6. A direction indicated by arrow X in FIG. 2 is a longitudinal direction of the suspension 11, and arrow Y represents a sway direction of the magnetic head.

Figures 3A, 3B:
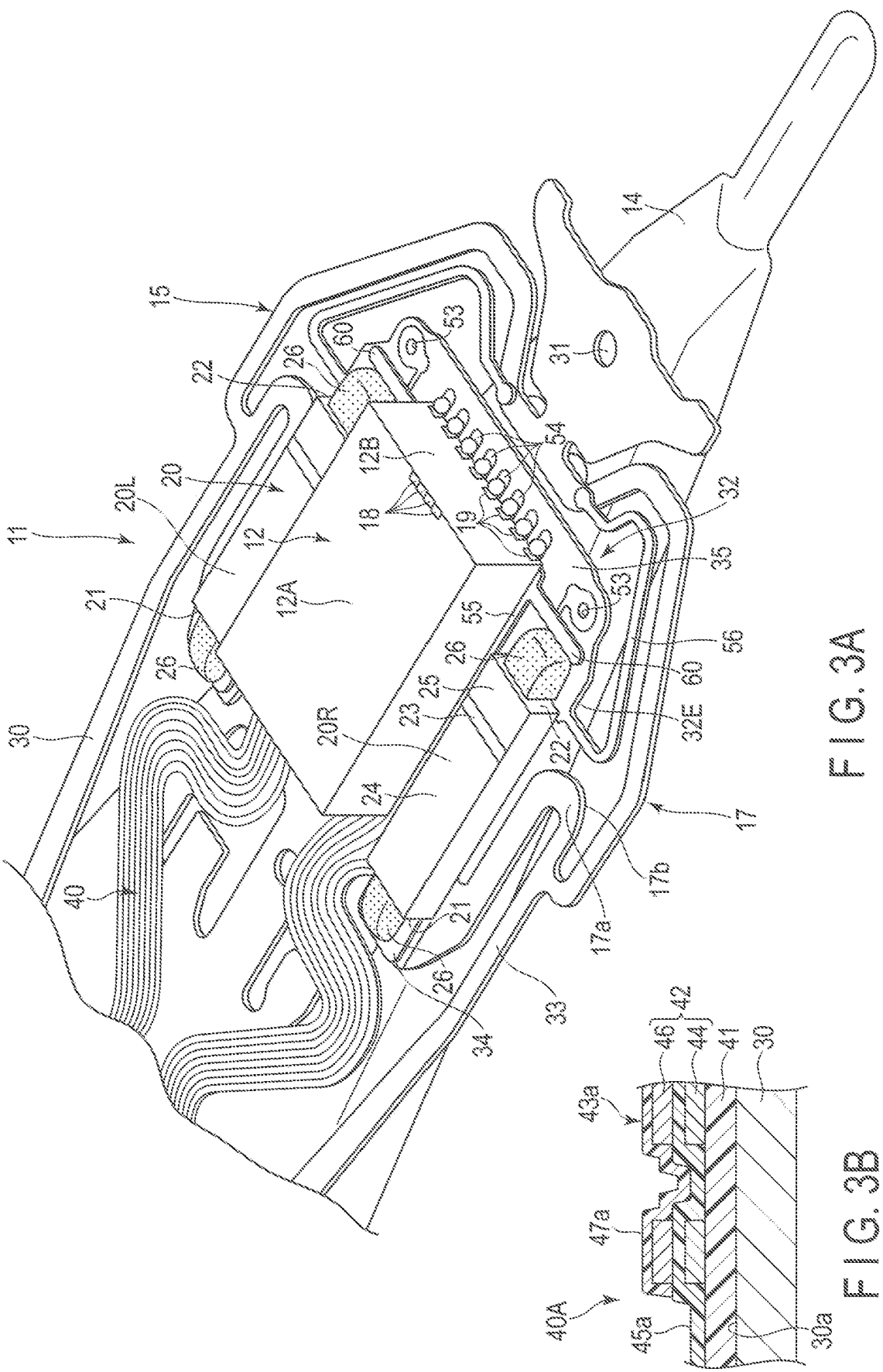
FIG. 3A is a perspective view of a gimbal portion of a suspension according to a first embodiment as seen from a slider side.
FIG. 3B is a cross-sectional view of a part of a circuit portion of the suspension shown in FIG. 3A.

The flexure 15 is arranged along the arm 10 and the load beam 14. At a proximal end portion of the flexure 15, a tail portion 16 is provided. At a distal end portion of the flexure 15, a gimbal portion 17 is provided. The tail portion 16 is connected to the flexible substrate 9 in the vicinity of the pivot 5. The gimbal portion 17 includes a first surface 17*a* on which the slider 12 is mounted, and a second surface 17*b* on a side opposite to the first surface 17*a*. The second surface 17*b* is opposed to the load beam 14. FIG. 3A is a perspective view of the gimbal portion 17 when seen from the side of the first surface 17*a*.

As shown in FIG. 3A, the slider 12 has a surface 12A opposed to the disk 4 (FIG. 2). When the disk 4 is rotated, air flows in between the surface 12A of the slider 12 and the disk 4. In this specification, with respect to the slider 12 and the gimbal portion 17, the side at which the air flows in is referred to as a leading side, and the side at which the air flows out is referred to as a trailing side. The leading-side portion of the slider 12 faces a proximal end portion of the flexure 15. The trailing-side portion of the slider 12 faces a distal end portion of the flexure 15.

A plurality of MR elements 18 are formed on an end portion 12B at the trailing side of the slider 12. The MR elements 18 can perform conversion between magnetic and electrical signals. The MR elements 18 serve as a magnetic head for accessing the disks 4 for writing and reading of data, for example. As shown in FIG. 3A, connecting terminals 19 are formed on the end portion 12B at the trailing side of the slider 12. The connecting terminals 19 are electrically connected to a circuit member 40 of the flexure 15. The slider 12 and the suspension 11 constitute a head gimbal assembly.

An actuator 20 is mounted on the first surface 17*a* of the gimbal portion 17. The actuator 20 includes a pair of actuator bodies 20L and 20R. The actuator 20 is disposed to be on both sides of the slider 12 with respect to the sway direction Y of the magnetic head. The actuator 20 moves the slider 12 in the sway direction Y. The actuator 20 has a shape extending along a side surface of the slider 12. Each of the actuator bodies 20L and 20R has a first end portion 21 on the leading side, and a second end portion 22 on the trailing side.

The actuator 20 comprises a piezoelectric element 23, a first electrode 24, and a second electrode 25. The piezoelectric element 23 is formed of a piezoelectric material such as lead zirconate titanate (PZT). Each of the first electrode 24 and the second electrode 25 is provided on a surface of the piezoelectric element 23. The first electrode 24 is provided on an upper surface of the actuator 20 and the first end portion 21. The second electrode 25 is provided on a lower surface of the actuator 20 and the second end portion 22. The first electrode 24 is electrically connected to a first pad 51 via an electrically conductive adhesive 26. The second electrode 25 is electrically connected to a second pad 52 via the electrically conductive adhesive 26. The first pad 51 and the second pad 52 will be described in detail later.

The flexure 15 comprises a metal base 30 and the circuit member 40. The metal base 30 is formed of a thin stainless steel plate, and can be deformed elastically. The circuit member 40 includes a part which overlaps the metal base 30, and a part which does not overlap the metal base 30. The metal base 30 is secured to the load beam 14 by a plurality of welds 31 formed by, for example, laser welding.

Figure 4:
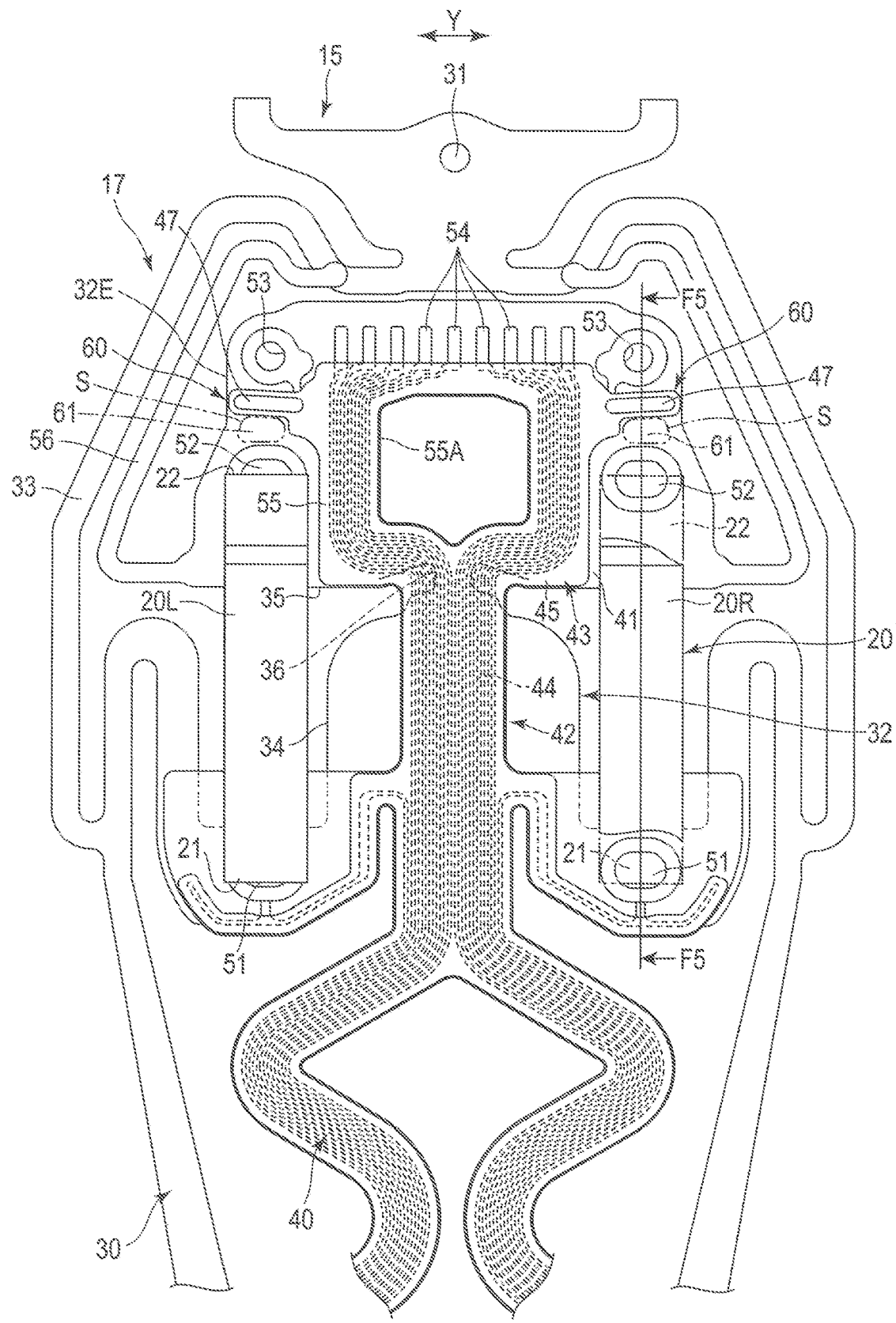
FIG. 4 is a plan view showing a part of the gimbal portion shown in FIG. 3A with the slider removed.

FIG. 4 is a plan view of the gimbal portion 17 shown by cutting a part of the actuator 20. The slider 12 is not depicted in FIG. 4. The metal base 30 of the gimbal portion 17 comprises a tongue portion 32, and a pair of outrigger portions 33. The slider 12 is mounted on the tongue portion 32. The outrigger portions 33 are arranged outside the tongue portion 32 along the tongue portion 32. A distal end portion of the circuit member 40 is arranged on the tongue portion 32.

An example of the tongue portion 32 shown in FIG. 4 includes a first tongue 34, a second tongue 35, and a hinge portion 36. The first tongue 34 is opposed to a leading-side portion of the slider 12. A tailing-side portion of the slider 12 is secured to the second tongue 35. The hinge portion 36 connects the first tongue 34 and the second tongue 35. The first tongue 34 is continuous with the outrigger portions 33. A dimple 14D (FIG. 2) is formed at a distal end portion of the load beam 14. The dimple 14D contacts the hinge portion 36. The second tongue 35 can be rotated in the sway direction Y (FIG. 2) about the hinge portion 36 relative to the load beam 14.

At least one of the first end portion 21 and the second end portion 22 of the actuator 20 is fixed to the tongue portion 32. In the example shown in FIG. 4, the first end portion 21 is fixed to the first tongue 34, and the second end portion 22 is fixed to the second tongue 35. Note that in the other embodiments, the metal base 30 of the tongue portion 32 and the metal base 30 of the outrigger portions 33 may not be continuous with each other. In that case, one of the first end portion 21 and the second end portion 22 may be fixed to the metal base 30 of the tongue portion 32, and the other one of the end portions may be fixed to the metal base 30 of the outrigger portions 33. The tongue portion 32 as described above can be supported on the outrigger portions 33 via the circuit member 40.

The circuit member 40 extends along the gimbal portion 17 from the tail portion 16 of the flexure 15. The circuit member 40 includes a portion overlapping the metal base 30, and a portion not overlapping the metal base 30. The circuit member 40 has flexibility, and can be deformed in a thickness direction. In particular, since a part of the circuit member 40 not overlapping the metal base 30 has small bending stiffness, such a part can be deformed easily.

The circuit member 40 comprises a base insulating layer 41, a conductor layer 42, and a cover insulating layer 43. The base insulating layer 41 is formed on the metal base 30. The conductor layer 42 is formed on the base insulating layer 41. The cover insulating layer 43 covers the conductor layer 42.

FIG. 3B shows a two-layer conductive circuit portion 40A which constitutes a part of the circuit member 40. The two-layer conductive circuit portion 40A is formed in a part different from the gimbal portion 17 likewise the tail portion 16 as shown in FIG. 2, for example. The conductor layer 42 of the two-layer conductive circuit portion 40A includes a first conductor 44 and a second conductor 46. The cover insulating layer 43a includes a first cover layer 45a and a second cover layer 47a. The first conductor 44 is formed on the base insulating layer 41. The first cover layer 45a covers the first conductor 44. The second conductor 46 is formed on the first cover layer 45a. The second cover layer 47a covers the second conductor 46.

As shown in FIG. 5, in the gimbal portion 17, the circuit member 40 comprises the base insulating layer 41, the conductor layer 42, and the cover insulating layer 43. The conductor layer 42 is constituted of the first conductor 44. The first conductor 44 is formed on the base insulating layer 41. The cover insulating layer 43 is constituted of a first cover layer 45 and a second cover layer 47. The first cover layer 45 covers the first conductor 44. The second cover layer 47 is formed on the first cover layer 45.

The first cover layer 45 (FIG. 5) of the gimbal portion 17 is formed of an electrically insulating resin (for example, polyimide), which is the same material as that of the first cover layer 45a of the two-layer conductive circuit portion 40A (FIG. 3B). The first cover layer 45 of the gimbal portion 17 and the first cover layer 45a of the two-layer conductive circuit portion 40A are formed substantially simultaneously by the same coating process by using the same material, i.e., polyimide. Consequently, the first cover layer 45 of the gimbal portion 17 and the first cover layer 45a of the two-layer conductive circuit portion 40A are formed of polyimide having the same chemical component.

The second cover layer 47 (FIG. 5) of the gimbal portion 17 is formed of an electrically insulating resin (for example, polyimide), which is the same material as that of the second cover layer 47a of the two-layer conductive circuit portion 40A (FIG. 3B). The second cover layer 47 of the gimbal portion 17 and the second cover layer 47a of the two-layer conductive circuit portion 40A are formed substantially simultaneously by the same coating process by using the same material, i.e., polyimide. Consequently, the second cover layer 47 of the gimbal portion 17 and the second cover layer 47a of the two-layer conductive circuit portion 40A are formed of polyimide having the same chemical component.

The first conductors 44 are each formed of a metal material such as copper. A thickness of the first conductor 44 is, for example 9 μm (4 to 16 μm). The base insulating layer 41 and the cover insulating layer 43 are each formed of an electrically insulating material such as polyimide. A thickness of the base insulating layer 41 is, for example 10 μm (5 to 20 μm). A thickness of each of the first cover layer 45 and the second cover layer 47 is, for example 5 μm (2 to 10 μm).

As shown in FIG. 4, in the tongue portion 32, the first conductor 44 includes the first pad 51, the second pad 52, a reference hole 53, and connecting terminals 54. The first pad 51 and the second pad 52 are formed in an oval shape, for example. As shown in FIG. 5, the first end portion 21 of the actuator 20 is arranged in the first pad 51. The second end portion 22 of the actuator 20 is arranged in the second pad 52. The reference hole 53 is formed in a circular shape, for example, and is used as a reference for positioning in mounting the slider 12. For example, a positioning pin is inserted into the reference hole 53. Alternatively, data obtained by performing image processing of the reference hole 53 may be used for positioning. The connecting terminals 54 as shown in FIG. 4 is formed in a strip shape, for example, and is electrically connected to the connecting terminals 19 (FIG. 3) of the slider 12. The reference hole 53 and the connecting terminals 54 are examples of portions to be protected located outside a wall portion 60 which will be described later.

As shown in FIG. 4, a slider mounting portion 55 which supports the slider 12 is provided between the pair of actuator bodies 20L and 20R. The slider mounting portion 55 is constituted of the first cover layer 45 of the cover insulating layer 43. The slider mounting portion 55 has a shape conforming to an outer dimension of the slider 12 on the trailing side, and covers the first conductor 44. At the center of the slider mounting portion 55, a recess 55A in which an adhesive for fixing the slider 12 is filled is formed.

A limiter member 56 is provided between the tongue portion 32 and the outrigger portion 33. The limiter member 56 has the function of adjusting vibration characteristics of the gimbal portion 17. The limiter member 56 is formed of a resin material, which is the same as the material of the base insulating layer 41. The limiter member 56 elastically connects the tongue portion 32 and the outrigger portion 33. The limiter member 56 restrains the tongue portion 32 from being vibrating excessively when an impact is applied to the hard disk drive 1 externally. Also, the limiter member 56 has the function of preventing the dimple 14D from separating from the tongue portion 32 (i.e., dimple separation) when the impact is applied.

FIG. 5 is a cross-sectional view of the gimbal portion 17 taken along line F5-F5 of FIG. 4. The first end portion 21 of the actuator 20 is fixed to the first pad 51 via the electrically conductive adhesive 26. The second end portion 22 of the actuator 20 is fixed to the second pad 52 via the electrically conductive adhesive 26. The adhesive 26 is, for example, a conductive paste such as a silver paste. The silver paste includes a great amount of silver particles mixed in a pasty resin material, and is cured by being heated. The conductive adhesive 26 electrically connects the first end portion 21 and the first pad 51, and also mechanically fixes the first end portion 21 and the first pad 51 to each other. Also, the adhesive 26 electrically connects the second end portion 22 and the second pad 52, and also mechanically fixes the second end portion 22 and the second pad 52 to each other.

As the adhesive 26, two or more types of adhesives may be used together. For example, in addition to electrically connecting the first end portion 21 and the first pad 51 by the conductive paste, the first end portion 21 and the first pad 51 may be mechanically fixed to each other by a nonconductive paste. Further, in addition to electrically connecting the second end portion 22 and the second pad 52 by the conductive paste, the second end portion 22 and the second pad 52 may be mechanically fixed to each other by a nonconductive paste. Of the first end portion 21 and the second end portion 22, one of them is connected (grounded) to a ground electrode. In the example shown in FIG. 5, the first end portion 21 is electrically connected to the metal base 30 in the first pad (leading-side pad) 51. The metal base 30 is a conductor on the ground side.

The actuator 20 extends and contracts when a voltage is applied. Accordingly, the first end portion 21 and the second end portion 22 of the actuator 20 must be firmly fixed to the tongue portion 32. As shown in FIG. 5, the adhesive 26 is applied so as to cover the first pad 51. Also, the adhesive 26 is applied so as to cover the second pad 52. As shown in FIG. 4, etc., in the vicinity of the second pad (trailing-side pad) 52, the reference hole 53 and the connecting terminals 54 are provided. The reference hole 53 serves as a reference for positioning when the slider 12 is mounted on the gimbal portion 17. Adhesion of the adhesive 26 to the reference hole 53 causes the positioning accuracy of the slider 12 to be lowered. The connecting terminals 54 of the tongue portion 32 are connected to the connecting terminals 19 (FIG. 3) of the slider 12. Accordingly, when the adhesive 26 adheres to the connecting terminals 54, the reliability of connection between the connecting terminals 19 and 54 may be adversely affected.

The flexure 15 of this embodiment includes the wall portion 60. The wall portion 60 is formed between the second pad 52 to which the adhesive 26 is applied and the portion to be protected (for example, the reference hole 53) which should be prevented from having adhesion of the adhesive 26. As shown in FIGS. 4 and 5, the wall portion 60 comprises the base insulating layer 41, the first conductor 44, the first cover layer 45, and the second cover layer 47. A height of the second pad 52 from a surface 30a of the metal base 30 is represented by H1. A height of the wall portion 60 from the surface 30a of the metal base 30 is represented by H2. The height H2 of the wall portion 60 is greater than the height H1 of the second pad 52 by the thickness of the second cover layer 47.

As shown in FIG. 4, the wall portion 60 is provided more to the trailing side than the second pad 52 is. Moreover, the wall portion 60 is protruded toward an outer edge 32E of the tongue portion 32 from the slider mounting portion 55. A two-dot chain line S shown in FIG. 4 represents a reservoir region 61 formed between the second pad 52 and the wall portion 60. The reservoir region 61 is a region delimited for storing the adhesive 26 blocked by the wall portion 60.

The wall portion 60 of the embodiment shown in FIG. 4 extends in the sway direction Y. In other words, the wall portion 60 extends in a direction of intersecting a longitudinal direction of the actuator 20 at a position more distant from the second end portion 22 of the actuator 20 to the trailing side.

The present embodiment relates to the flexure 15 comprising the wall portion 60. The wall portion 60 prevents the adhesive 26 from flowing outside a predetermined region.

The adhesive 26 fixes the actuator 20 to the tongue portion 32. The flexure 15 includes the reference hole 53, the second pad 52, and the wall portion 60. The reference hole 53 is used for positioning when the slider 12 is mounted. The second end portion 22 of the actuator 20 is arranged on the second pad 52. The wall portion 60 is formed between the reference hole 53 and the second pad 52. The wall portion 60 prevents the adhesive 26 applied to the second end portion 22 and the second pad 52 from moving toward the reference hole 53. By the wall portion 60, entry of the adhesive 26 into the reference hole 53 is prevented.

H1 in FIG. 5 represents the height of the second pad 52 from the surface 30a of the metal base 30. H2 represents the height of the wall portion 60 from the surface 30a of the metal base 30. If the height H1 of the second pad 52 is small, an amount of application of the adhesive 26 covering the second pad 52 can be reduced. If the height H2 of the wall portion 60 is large, even if the amount of application of the adhesive 26 is increased, the adhesive 26 can be blocked by the wall portion 60. Accordingly, preferably, a difference in height between the height H1 of the second pad 52 and the height H2 of the wall portion 60 should be large. In the case of the embodiment shown in FIG. 5, by providing polyimide, which is the same material as that of the second cover layer 47a of the two-layer conductive circuit portion 40A (FIG. 3B), on top of the first cover layer 45 of the wall portion 60, the second cover layer 47 is formed in the wall portion 60. In this way, the height H2 of the wall portion 60 is increased by the thickness of the second cover layer 47. Moreover, by performing a half-tone process on the base insulating layer 41 of the second pad 52, the thickness of the base insulating layer 41 may be reduced locally so that the height H1 of the second pad 52 is relatively reduced.

Second to Seventh Embodiments

In gimbal portions 17A to 17F of second to seventh embodiments described below, reference numbers which are the same as those of the first embodiment are assigned to parts having structures and functions having commonality with the gimbal portion 17 of the first embodiment described above, and explanation of such parts will be omitted.

Figure 6:
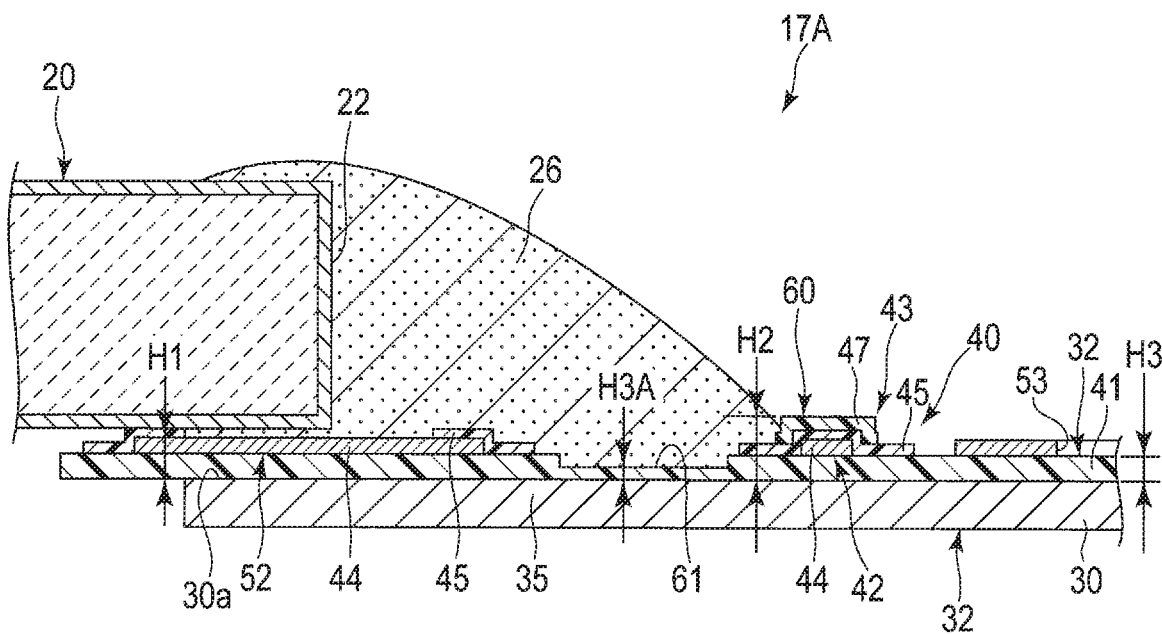
FIG. 6 is a cross-sectional view of a part of a gimbal portion according to a second embodiment.

FIG. 6 is a cross-sectional view showing a part of the gimbal portion 17A according to the second embodiment. A reservoir region 61 of the gimbal portion 17A is constituted of a recess formed between a second pad 52 and a wall portion 60. More specifically, a height H3A of a part of a base insulating layer 41 of the reservoir region 61 is made less than a height H3 of the base insulating layer 41 at a part other than the reservoir region 61. As a result, the reservoir region 61 constituted of the recess is formed on the inner side with respect to the wall portion 60, and an amount of an adhesive 26 which can be stored is increased. The height H3A at the part of the base insulating layer 41 of the reservoir region 61 can be adjusted by a multi-tone process such as the half-tone process.

Figure 7:
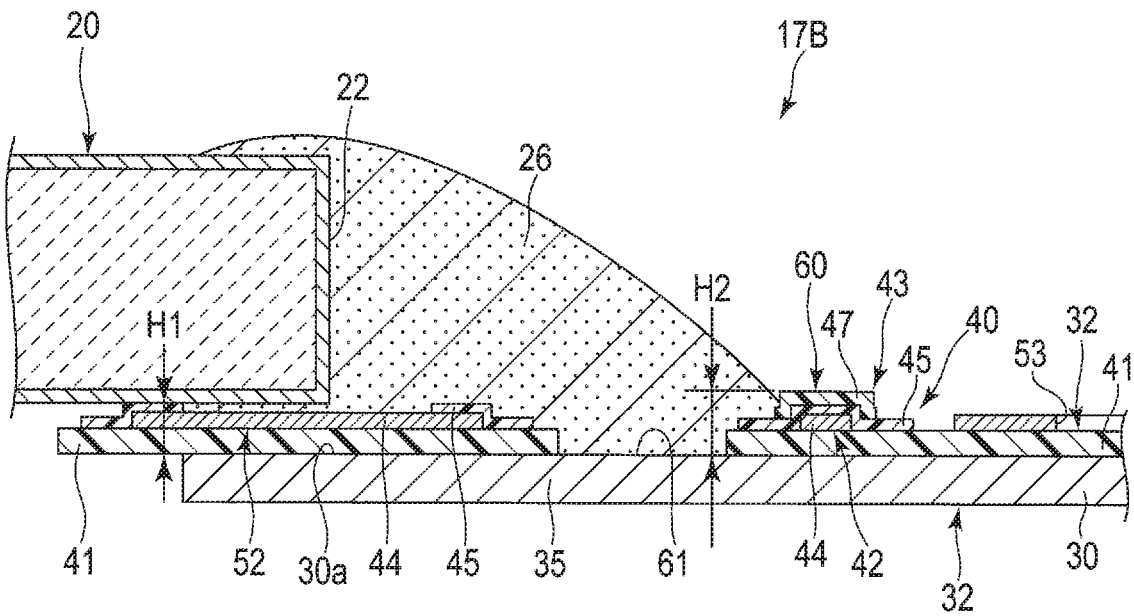
FIG. 7 is a cross-sectional view of a part of a gimbal portion according to a third embodiment.

FIG. 7 is a cross-sectional view showing a part of the gimbal portion 17B according to the third embodiment. A base insulating layer 41 is not formed at a part corresponding to a reservoir region 61 of the gimbal portion 17B. According to the gimbal portion 17B, since the volume of the reservoir region 61 can be further increased, an amount of an adhesive 26 which can be stored at the inner side relative to a wall portion 60 can be further increased. In order to form such a reservoir region 61, in forming the base insulating layer 41 on a metal base 30, the base insulating layer 41 is not to be provided in the reservoir region 61. Alternatively, after forming the base insulating layer 41 on the entire surface of the metal base 30, the base insulating layer 41 at a portion corresponding to the reservoir region 61 may be removed by a full-tone process.

FIG. 8 is a cross-sectional view showing a part of the gimbal portion 17C according to the fourth embodiment. In the gimbal portion 17C, a height H1B of a base insulating layer 41 formed in a second pad 52 is made less than a height H3 of the base insulating layer 41 formed in a wall portion 60. The height H1B of the base insulating layer 41 of the second pad 52 can be adjusted by a half-tone process, etc. Since the height H1B of the base insulating layer 41 is small, a height H1 of the second pad 52 can be made small accordingly. If the height H1 of the second pad 52 is small, an amount of application of an adhesive 26 covering a second end portion 22 of an actuator 20 can be reduced. Accordingly, the adhesive 26 can be more reliably blocked by the wall portion 60.

FIG. 9 is a cross-sectional view showing a part of the gimbal portion 17D according to the fifth embodiment. In the gimbal portion 17D, a height H3A of a part of a base insulating layer 41 at a reservoir region 61 is made less than a height H3 of the base insulating layer 41 at a part other than the reservoir region 61. In this way, an amount of an adhesive 26 which can be stored in the reservoir region 61 is increased. Further, by making a height H1 of a second pad 52 less than a height H2 of a wall portion 60, the volume of the reservoir region 61 is increased.

Figure 10:
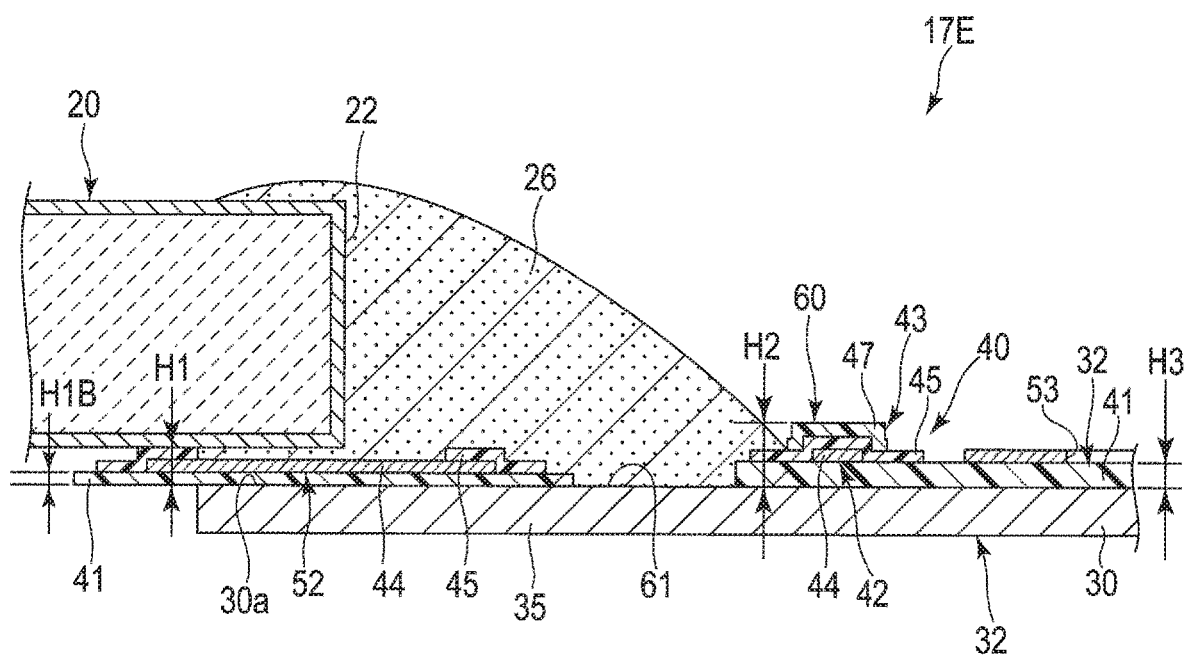
FIG. 10 is a cross-sectional view of a part of a gimbal portion according to a sixth embodiment.

FIG. 10 is a cross-sectional view showing a part of the gimbal portion 17E according to the sixth embodiment. In the gimbal portion 17E, a height H1B of a base insulating layer 41 formed at a second pad 52 is made approximately half the height H3 of the base insulating layer 41 at a part other than the second pad 52. In a portion corresponding to a reservoir region 61, a base insulating layer 41 is not formed. In this way, the volume of the reservoir region 61 is increased.

Figure 11:
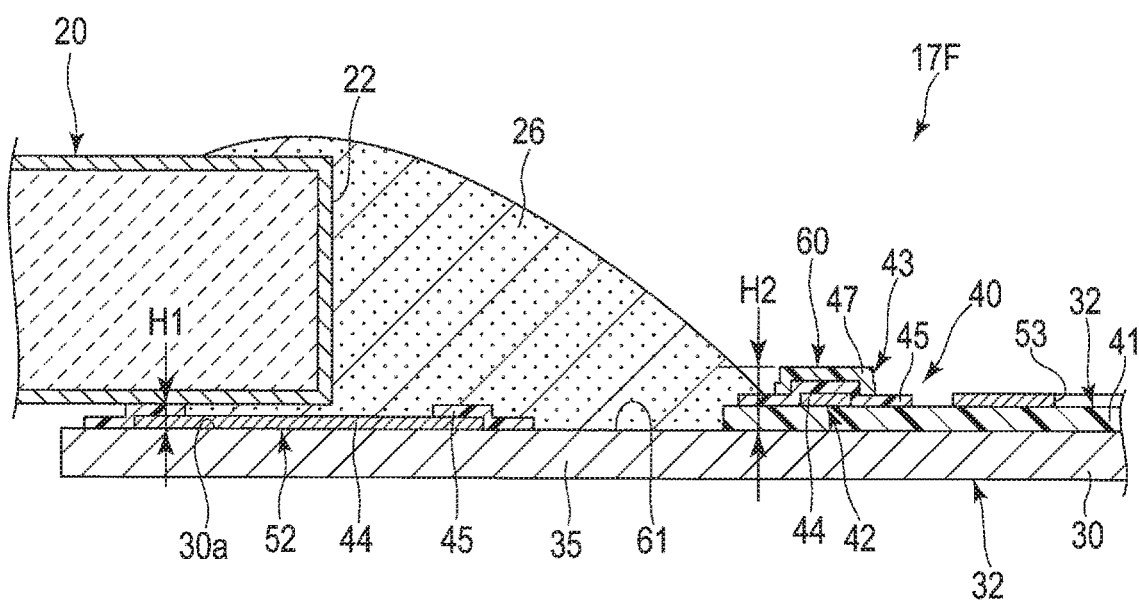
FIG. 11 is a cross-sectional view of a part of a gimbal portion according to a seventh embodiment.

FIG. 11 is a cross-sectional view showing a part of the gimbal portion 17F according to the seventh embodiment. In the gimbal portion 17F, a base insulating layer 41 is not formed between a second pad 52 and a reservoir region 61. Accordingly, the second pad 52 serves as a ground electrode. In the second pad 52, no base insulating layer 41 is provided. Accordingly, a height H1 of the second pad 52 can be made less than the height H1 of the second pad 52 of the sixth embodiment (FIG. 10). In other words, according to the gimbal portion 17F, a difference between the height H1 of the second pad 52 and a height H2 of a wall portion 60 can further be increased. Consequently, entry of an adhesive 26 into a reference hole 53 can be more reliably prevented by the wall portion 60.

The gimbal portions 17 and 17A to 17F of the first embodiment (FIG. 5) to the seventh embodiment (FIG. 11) structured as described above have the wall portion 60 between the second pad 52 and the reference hole 53. The wall portion 60 prevents the adhesive 26 applied to the second end portion 22 and the second pad 52 from moving toward the reference hole 53. According to these gimbal portions 17 and 17A to 17F, even if the adhesive 26 is applied in an amount sufficient to cover the second pad 52, adhesion of the adhesive 26 to the reference hole 53 can be prevented. Accordingly, anchorage strength and electrical connection reliability of the actuator 20 with respect to the second pad 52 can be ensured. Also, since adhesion of the adhesive 26 to the reference hole 53 and the connecting terminals 54 can be prevented, troubles caused by adhesion of the adhesive 26 can be prevented.

If the height H1 of the second pad 52 can be reduced, an amount of application of the adhesive 26 covering the second pad 52 can be reduced. If the height H2 of the wall portion 60 is large, even if the amount of application of the adhesive 26 is increased, the adhesive 26 can be blocked by the wall portion 60. The gimbal portions 17 and 17A to 17F of the first embodiment (FIG. 5) to the seventh embodiment (FIG. 11) are structured such that a difference in height between the wall portion 60 and the second pad 52 is increased.

In the gimbal portions 17 and 17A to 17F of each of the embodiments, the second cover layer 47 of the wall portion 60 is formed by using polyimide, which is the same material as that of the second cover layer 47a of the two-layer conductive circuit portion 40A, in forming the two-layer conductive circuit portion 40A (FIG. 3B). By the second cover layer 47, the height H2 of the wall portion 60 can be increased. Further, in the fourth embodiment (FIG. 8) to the sixth embodiment (FIG. 10), the height H1B of the base insulating layer 41 formed at the second pad 52 is made approximately half the height H3 of the base insulating layer 41 at the part other than the second pad 52. In this way, a difference in height between the wall portion 60 and the second pad 52 can be further increased.

Eighth to Twelfth Embodiments

Next, gimbal portions 17G, 17H, 17J, 17K, and 17L according to eighth to twelfth embodiments will now be described with reference to FIGS. 12 to 16. In these embodiments, reference numbers which are the same as those of the first to seventh embodiments described above are assigned to parts having structures and functions having commonality with the gimbal portions 17 and 17A to 17F of the above first to seventh embodiments, and explanation of such parts will be omitted.

Figure 12:
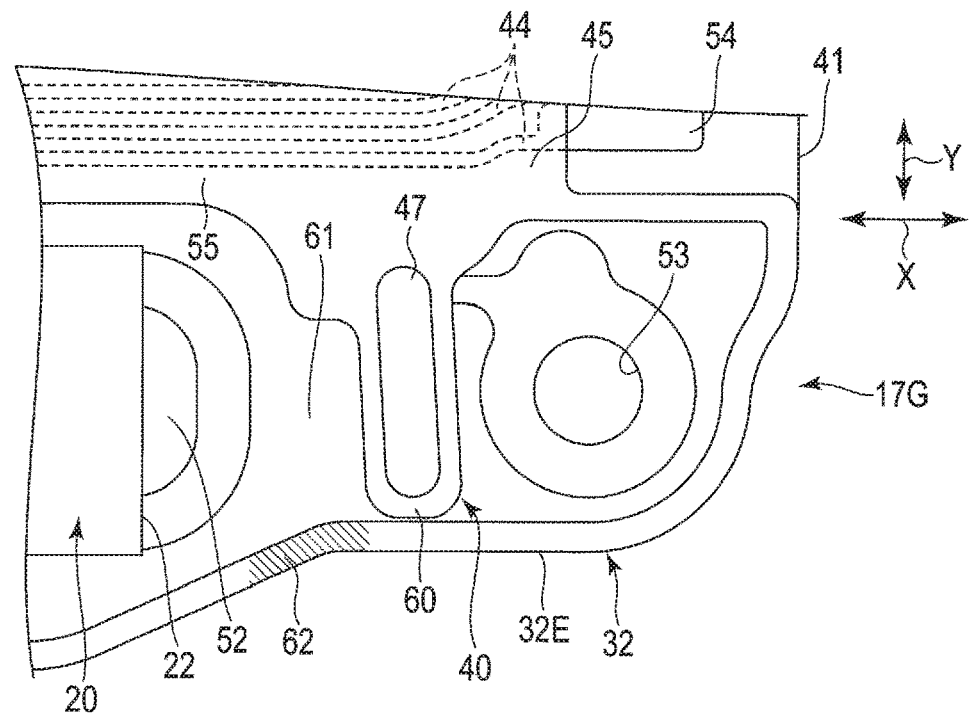
FIG. 12 is a plan view of a part of a gimbal portion according to an eighth embodiment.

FIG. 12 is a plan view of a part of the gimbal portion 17G according to the eighth embodiment. The gimbal portion 17G comprises a surrounding portion 62. The surrounding portion 62 is formed of a first cover layer 45. The surrounding portion 62 is provided along an outer edge 32E of a tongue portion 32 in the vicinity of a second pad 52. The surrounding portion 62 covers at least a part facing a reservoir region 61 of the outer edge 32E (a region hatched in FIG. 12). Note that a gap may be formed between a wall portion 60 and the surrounding portion 62.

As shown in FIG. 12, the surrounding portion 62 is provided outside the second pad 52 with respect to the sway direction Y of the gimbal portion 17G. With respect to the sway direction Y of the gimbal portion 17G, a slider mounting portion 55 is provided at the inner side relative to the second pad 52. A slider 12 (FIG. 3A) is mounted on the slider mounting portion 55. With respect to a longitudinal direction X of the gimbal portion 17G, the wall portion 60 is provided at a position distant from the second pad 52 to the trailing side. The second pad 52 is surrounded by the slider mounting portion 55, the wall portion 60, and the surrounding portion 62.

The gimbal portion 17G structured as described above can also prevent an adhesive supplied to the second pad 52 from adhering to a portion to be protected such as a reference hole 53. The gimbal portion 17G includes the surrounding portion 62 formed at a part of the outer edge 32E of the tongue portion 32. By the surrounding portion 62, it is possible to prevent an adhesive 26 from flowing out of the outer edge 32E of the tongue portion 32. As in the embodiment shown in FIG. 4, the gimbal portion 17G includes a limiter member 56 formed between the tongue portion 32 and outrigger portions 33. The limiter member 56 has the function of adjusting vibration characteristics of the gimbal portion 17. According to the gimbal portion 17G shown in FIG. 12, overflow of the adhesive from the tongue portion 32 can be prevented by the surrounding portion 62. Accordingly, a problem such as the spring properties of the gimbal portion 17 being changed, which is caused by adhesion of the adhesive to the outrigger portions 33 and the limiter member 56, can be avoided.

Figure 13:
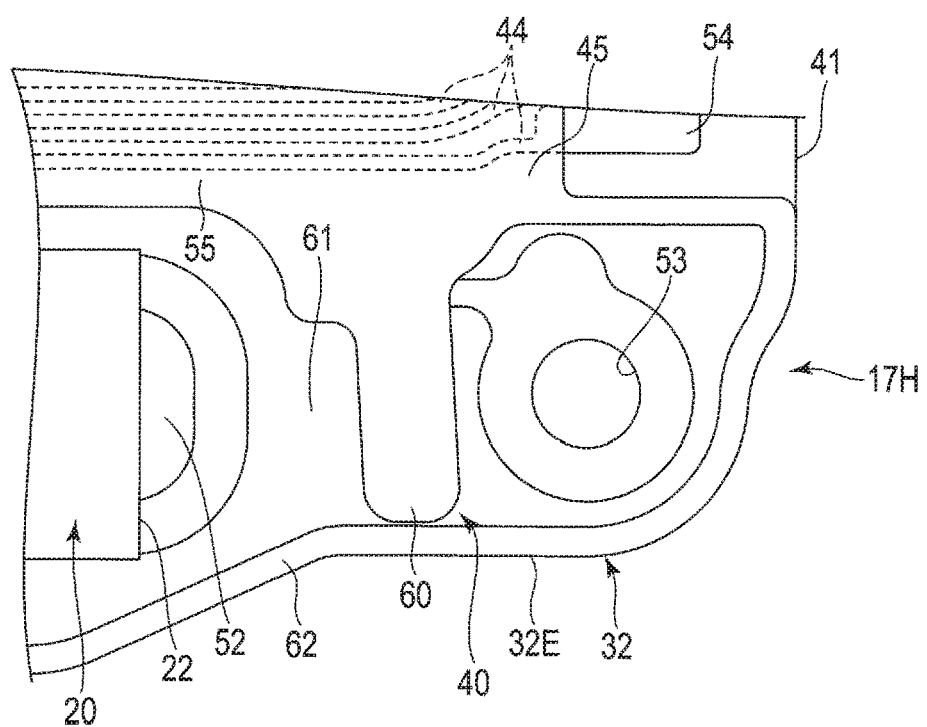
FIG. 13 is a plan view of a part of a gimbal portion according to a ninth embodiment.

FIG. 13 is a plan view of a part of the gimbal portion 17H according to the ninth embodiment. By a slider mounting portion 55, a wall portion 60, and a surrounding portion 62, a reservoir region 61 in which an adhesive can be accumulated is formed. The wall portion 60 of the gimbal portion 17H does not include the second cover layer 47 shown in FIG. 12. If the volume of the reservoir region 61 is sufficient, the second cover layer 47 can be omitted.

Figure 14:
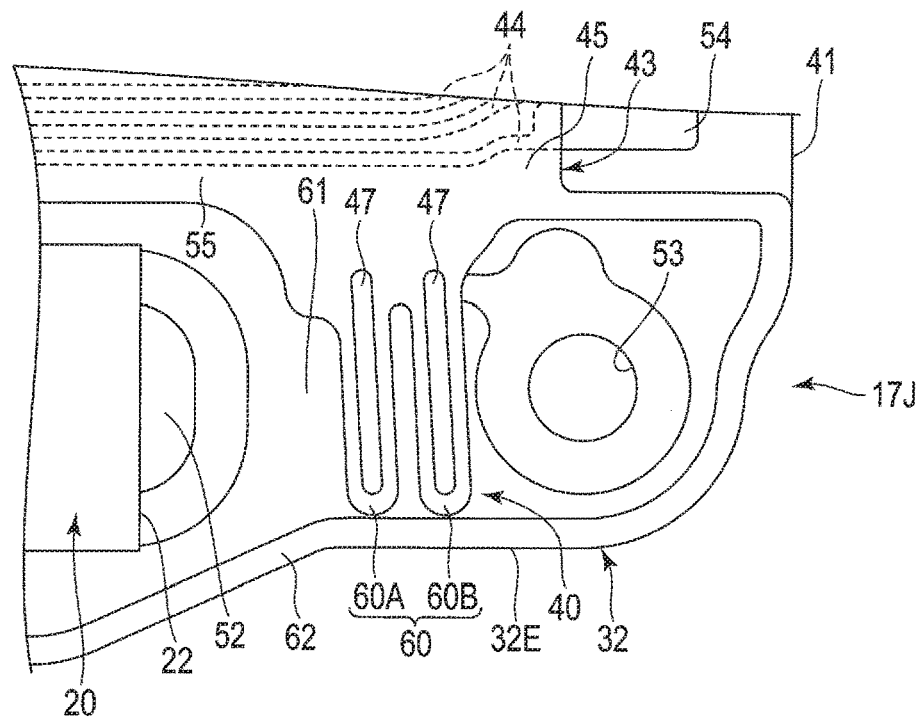
FIG. 14 is a plan view of a part of a gimbal portion according to a tenth embodiment.

FIG. 14 is a plan view of a part of the gimbal portion 17J according to the tenth embodiment. The gimbal portion 17J includes a wall portion 60 constituted of a plurality of walls 60A and 60B. The plurality of walls 60A and 60B which constitute the wall portion 60 are provided between a second pad 52 and a reference hole 53. The wall portion 60 may be constituted of three or more walls, i.e., walls 60A, 60B, etc. For example, even if an adhesive cannot be completely blocked by the first wall 60A, adhesion of the adhesive to a portion to be protected (for example, a reference hole 53) can be prevented by the second wall 60B or the third wall.

Figure 15:
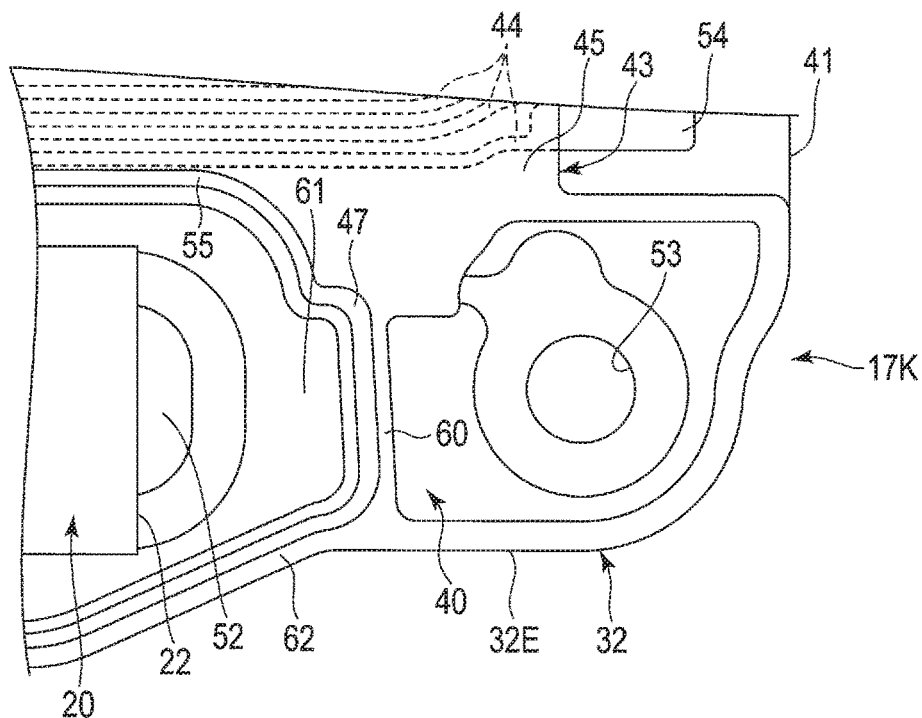
FIG. 15 is a plan view of a part of a gimbal portion according to an eleventh embodiment.

FIG. 15 is a plan view of a part of the gimbal portion 17K according to the eleventh embodiment. A cover insulating layer 43 which constitutes a surrounding portion 62 of the gimbal portion 17K comprises a second cover layer 47, in addition to a first cover layer 45. The second cover layer 47 overlaps the first cover layer 45 in a thickness direction. First conductors 44 are buried in the surrounding portion 62, and the thickness of the surrounding portion 62 is increased due to the first conductor 44. According to the gimbal portion 17K comprising such a cover insulating layer 43, the height of the surrounding portion 62 can be further increased. Consequently, entry of an adhesive into a portion to be protected (for example, a reference hole 53) can be more reliably prevented.

Figure 16:
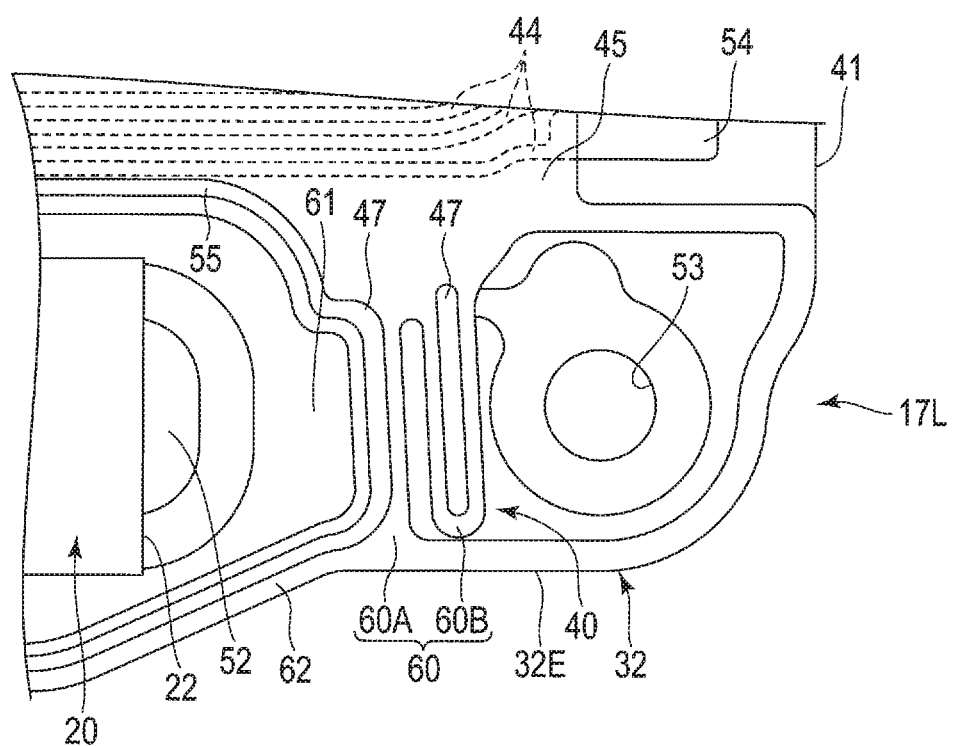
FIG. 16 is a plan view of a part of a gimbal portion according to a twelfth embodiment.

FIG. 16 is a plan view of a part of the gimbal portion 17L according to the twelfth embodiment. The gimbal portion 17L includes a first wall 60A continuous with a surrounding portion 62, and a second wall 60B separated from the surrounding portion 62. The first wall 60A and the second wall 60B are formed at positions separated from each other. As a second cover layer 47 overlaps a first cover layer 45, the height of the surrounding portion 62 can be increased due to the second cover layer 47. The gimbal portion 17L can also prevent an adhesive from entering into a reference hole 53 more reliably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure of a disk drive comprising:
    a metal base including a tongue portion on which a slider is mounted;
    an actuator which moves the slider;
    a circuit member along the metal base; and
    an adhesive which fixes an end portion of the actuator to the tongue portion,
    the circuit member comprising:
    a base insulating layer formed on the metal base of the tongue portion;
    a conductor layer formed on the base insulating layer;
    a cover insulating layer covering the conductor layer, and including a first cover layer and a second cover layer formed on the first cover layer;
    a pad on which the end portion of the actuator is arranged, and to which the adhesive is applied;
    a portion to be protected for which adhesion of the adhesive is to be avoided; and
    a wall portion formed between the pad and the portion to be protected, the wall portion comprising at least a part of the second cover layer, and a height of the wall portion from a surface of the metal base being greater than a height of the pad.

2. The flexure of claim 1, wherein the portion to be protected comprises a reference hole for positioning of the slider.

3. The flexure of claim 1, wherein the portion to be protected comprises a connecting terminal electrically connected to the slider.

4. The flexure of claim 1, wherein:
    the flexure comprises a reservoir region between the pad and the wall portion; and
    the reservoir region comprises a recess in which a height of a part of the base insulating layer formed in the reservoir region is less than a height of a part of the base insulating layer formed in the wall portion.

5. The flexure of claim 1, wherein the flexure comprises a reservoir region comprising a recess without the base insulating layer being formed between the pad and the wall portion.

6. The flexure of claim 1, wherein a height of a part of the base insulating layer formed in the pad from the metal base is less than a height of a part of the base insulating layer formed in the wall portion.

7. The flexure of claim 1, wherein the circuit member further comprises a reservoir region formed between the pad and the wall portion, and a surrounding portion formed at a part facing at least the reservoir region at an outer edge of the tongue portion.

8. The flexure of claim 1, wherein:
    the circuit member includes a two-layer conductive circuit portion;
    the two-layer conductive circuit portion comprises a first conductor formed on the base insulating layer, a first cover layer for the two-layer conductive circuit portion covering the first conductor, a second conductor formed on the first cover layer for the two-layer conductive circuit portion, and a second cover layer for the two-layer conductive circuit portion covering the second conductor; and
    the wall portion comprises a first cover layer for the wall portion, which is made of polyimide having a same chemical composition as that of the first cover layer of the two-layer conductive circuit portion, and a second cover layer for the wall portion, which is formed on the first cover layer of the wall portion, and is made of polyimide having the same chemical composition as that of the second cover layer of the two-layer conductive circuit portion.

* * * * *